(12) United States Patent
Reeves (10) Patent No.: US 10,724,568 B2
(45) Date of Patent: Jul. 28, 2020

(54) SEALANT APPLICATION SYSTEM

(71) Applicant: Honda Motor Co., Ltd., Tokyo (JP)

(72) Inventor: Israel Donnell Reeves, Southside, AL (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/131,786

(22) Filed: Sep. 14, 2018

(65) Prior Publication Data
US 2020/0088229 A1   Mar. 19, 2020

(51) Int. Cl.
| F16B 33/00 | (2006.01) |
| F16J 15/14 | (2006.01) |
| A46B 17/02 | (2006.01) |
| B67D 7/02 | (2010.01) |

(52) U.S. Cl.
CPC .......... *F16B 33/004* (2013.01); *B67D 7/0294* (2013.01); *F16J 15/14* (2013.01); *A46B 17/02* (2013.01)

(58) Field of Classification Search
CPC ....... F16B 33/004; B43M 11/04; B43M 11/06
USPC ............................. 401/9, 118, 120, 126, 130
See application file for complete search history.

(56) References Cited

U.S. PATENT DOCUMENTS

| 563,597 | A | * | 7/1896 | Jones | ..................... B27G 11/02 |
| | | | | | 401/120 |
| 721,112 | A | * | 2/1903 | Weaver | ................. G01F 11/286 |
| | | | | | 222/205 |
| 744,939 | A | * | 11/1903 | Reynolds | ............... B44D 3/126 |
| | | | | | 15/257.05 |
| 940,333 | A | * | 11/1909 | Lawson | ................ G01F 11/263 |
| | | | | | 222/425 |
| 1,540,829 | A | * | 6/1925 | Burnett | .................. B43M 11/04 |
| | | | | | 401/130 |
| 2,203,571 | A | * | 6/1940 | Hutchison | .............. B27G 11/02 |
| | | | | | 401/120 |
| 2,767,417 | A | * | 10/1956 | Amen | ................. B05B 11/3001 |
| | | | | | 401/9 |
| 3,266,459 | A | * | 8/1966 | Anthony | .................. B05D 1/18 |
| | | | | | 118/685 |
| 3,456,851 | A | * | 7/1969 | Skora | ..................... B65D 83/28 |
| | | | | | 222/205 |
| 3,542,261 | A | * | 11/1970 | Greenberg | ............... B44D 3/12 |
| | | | | | 222/576 |
| 3,765,983 | A | * | 10/1973 | Putzier | ................ B29C 65/4895 |
| | | | | | 156/293 |

(Continued)

FOREIGN PATENT DOCUMENTS

| CN | 202238518 | 5/2012 |
| CN | 203711289 | 7/2014 |

*Primary Examiner* — David P Angwin
*Assistant Examiner* — Bradley S Oliver
(74) *Attorney, Agent, or Firm* — Rankin, Hill & Clark LLP (57) ABSTRACT

A sealant application system for applying sealant to a surrounding surface into which an associated fastener extends includes a source of sealant and a concentrator. The concentrator includes a housing with a top wall, a bottom wall, and a side wall. The housing includes an inner chamber for receiving sealant. One of the housing walls has inlet port in communication with both the source of sealant and the inner chamber for delivery of sealant into the inner chamber. The top wall has formed therein an open basin in communication with the inner chamber. An applicator tool separate from the concentrator receives the sealant from within the basin.

19 Claims, 12 Drawing Sheets

(56) References Cited

U.S. PATENT DOCUMENTS

| | | | | |
|---|---|---|---|---|
| 3,889,628 A | * | 6/1975 | Usab | B05C 17/002 |
| | | | | 118/711 |
| 4,917,520 A | | 4/1990 | Reid | |
| 5,332,325 A | * | 7/1994 | Crosnier | A45D 34/043 |
| | | | | 401/119 |
| 5,945,076 A | * | 8/1999 | Leonard | A47K 11/10 |
| | | | | 134/184 |
| 6,053,649 A | * | 4/2000 | Ronai | A45D 26/0014 |
| | | | | 401/1 |
| 6,296,410 B1 | * | 10/2001 | Ruizendaal | A61M 35/003 |
| | | | | 401/119 |
| 7,118,078 B2 | | 10/2006 | Vukas | |
| 8,142,090 B2 | * | 3/2012 | Kamada | A45D 40/262 |
| | | | | 132/218 |
| 8,967,895 B2 | | 3/2015 | Svendsen | |
| 10,301,085 B2 | * | 5/2019 | Duquet | A45D 34/045 |
| 2008/0010342 A1 | | 1/2008 | Gebhardt et al. | |

\* cited by examiner

SEALANT APPLICATION SYSTEM

BACKGROUND

The present disclosure generally relates to a system for applying sealant to a surrounding surface into which a fastener, for example a bolt, extends to provide a fluid-tight seal between the fastener head and the surrounding surface. Vehicles are typically assembled by fastening together various components, for example by bolting one component to another. To provide a fluid-tight seal between the fastener head and the surrounding surface of a threaded opening, a sealant is generally applied along the interface between the fastener head and the surrounding surface. Current techniques for applying sealant are typically manual such as brushing sealant onto the surrounding surface or using a dispenser, with or without a metered supply of sealant. These current techniques can have results that vary with personnel applying the sealant and between applications performed by the same individual. These methods can also often lead to an excess amount of sealant applied, and can lead to the sealant being applied into the threaded opening for the fastener which can affect the tightening of the fastener.

BRIEF DESCRIPTION

According to one aspect, a sealant application system for applying sealant to a surrounding surface into which an associated fastener extends comprises a source of sealant and a concentrator. The concentrator includes a housing with a top wall, a bottom wall, and a side wall. The housing includes an inner chamber for receiving sealant. One of the housing walls has inlet port in communication with both the source of sealant and the inner chamber for delivery of sealant into the inner chamber. The top wall has formed therein an open basin in communication with the inner chamber. An applicator tool separate from the concentrator receives the sealant from within the basin.

According to another aspect, a sealant application system for applying sealant to a surrounding surface into which an associated fastener extends comprises a source of sealant and a concentrator including an inlet port in communication with the source of sealant. A pressure regulator is fluidly connected between the source of sealant and the concentrator, and a dispensing valve is fluidly connected between the pressure regulator and the concentrator. A switch is operably connected to the dispensing valve, and actuation of the dispensing valve via the switch delivers a metered supply of the sealant to the concentrator. An applicator tool separate from the concentrator is adapted to receive the sealant from within the concentrator.

According to another aspect, a sealant concentrator is provided for use with a sealant application system for applying sealant to a surrounding surface into which an associated fastener extends. The concentrator comprises a housing with a top wall, a bottom wall, and a side wall. The housing includes an inner chamber for receiving sealant. One of the housing walls has inlet port in communication with the inner chamber. The top wall has formed therein an open basin in communication with the inner chamber. A chimney located within the inner chamber extends between the top and bottom walls.

DETAILED DESCRIPTION

It should, of course, be understood that the description and drawings herein are merely illustrative and that various modifications and changes can be made in the structures disclosed without departing from the present disclosure. Any term of degree used herein, such as "substantially" and "approximately" means a reasonable amount of deviation of the modified word is contemplated such that the end result is not significantly changed.

Figure 1:
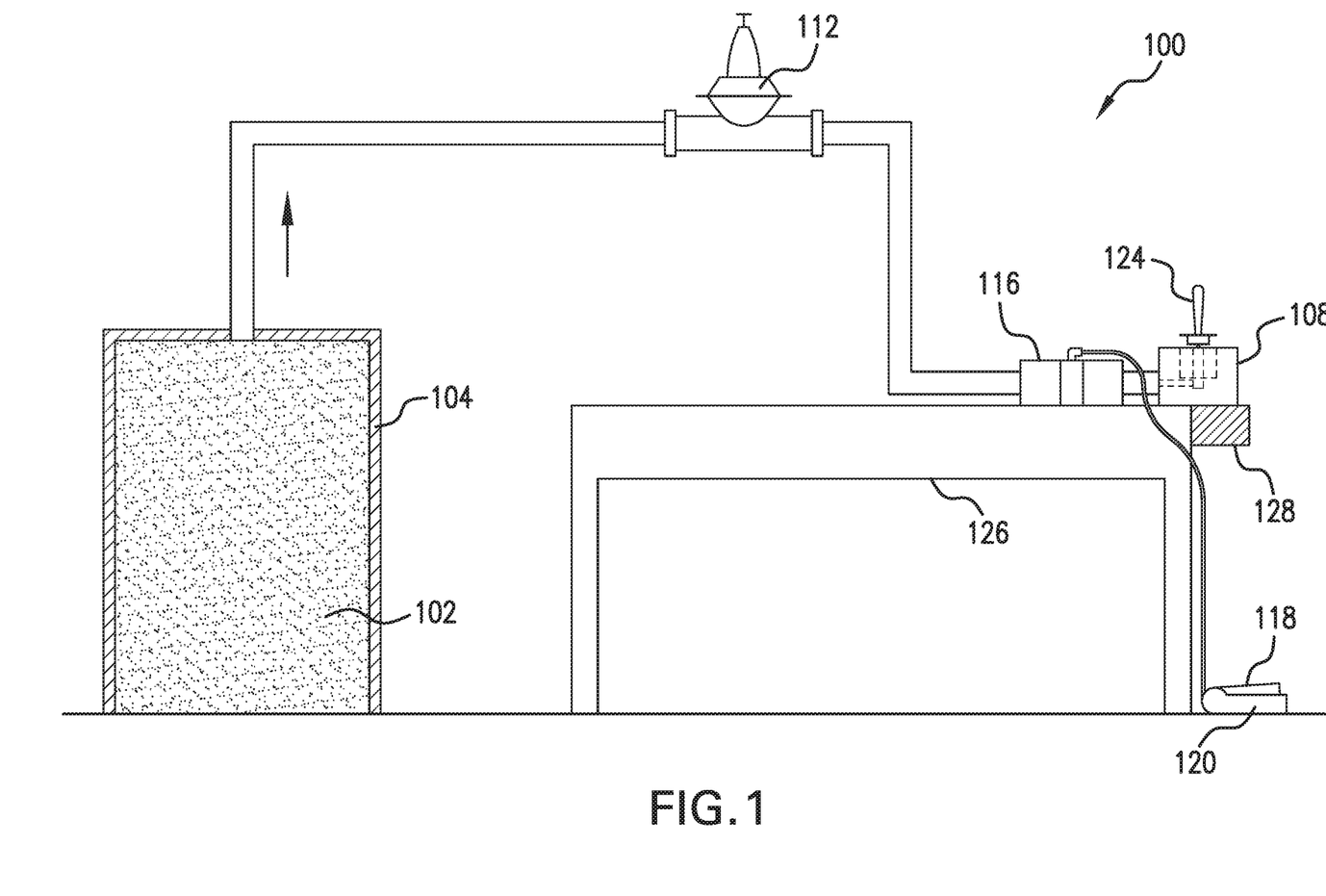
FIG. 1 schematically illustrates an exemplary sealant application system according to one aspect of the present disclosure.
Figure 2:
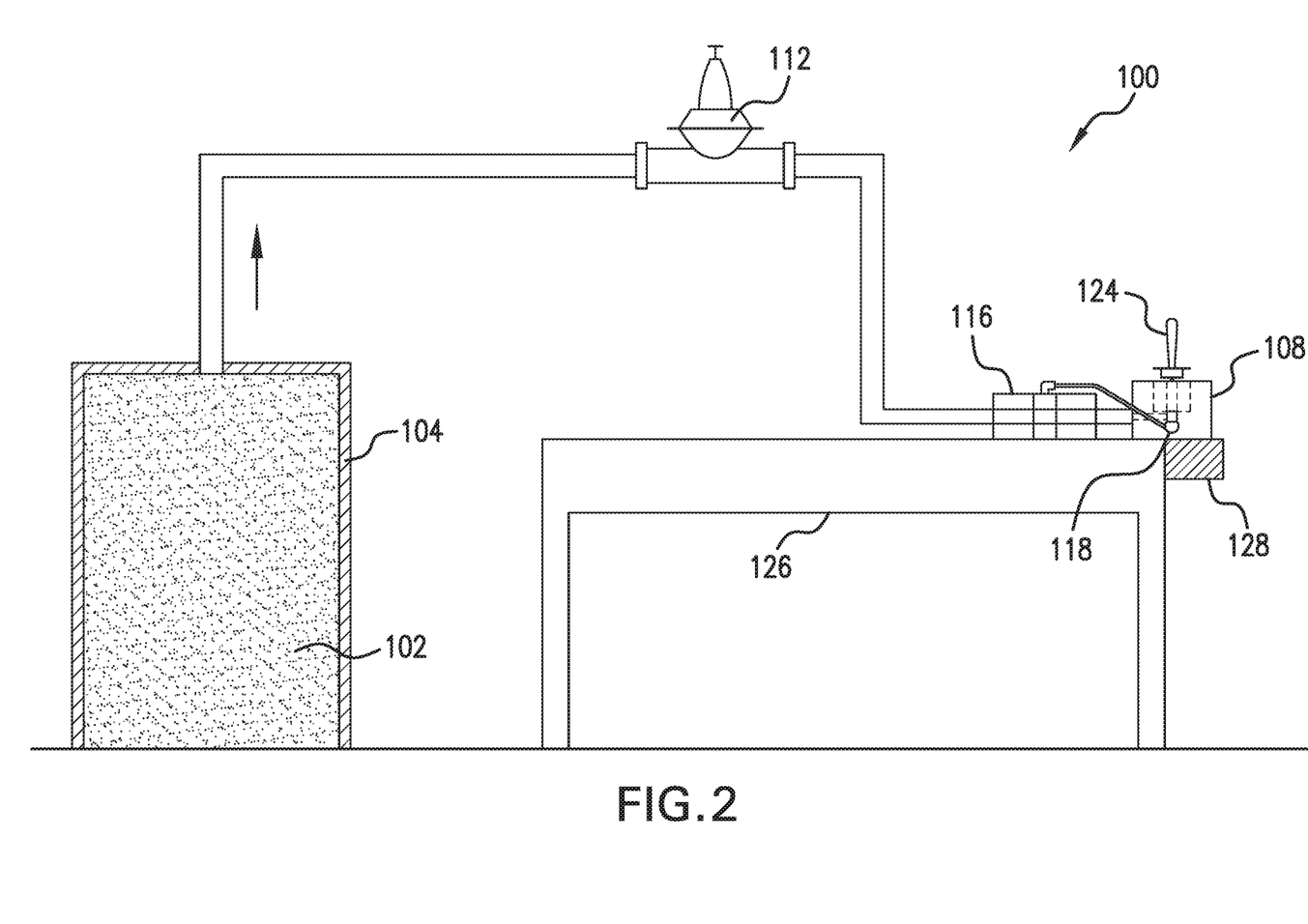
FIG. 2 schematically illustrates the sealant application system according to another aspect of the present disclosure.

Referring now to the drawings, wherein like numerals refer to like parts throughout the several views, FIG. 1 schematically illustrates a sealant application system 100 for applying sealant 102 to a surrounding surface into which an associated fastener extends. The system 100 comprises a source of sealant 104 (e.g., a barrel having the sealant stored therein) and a sealant concentrator 108 including an inlet port 110 in communication with the source of sealant 104. A pressure regulator 112 for reducing input pressure of the flow of sealant 102 to a desired valve at its output is fluidly connected between the source of sealant 104 and the concentrator 108, and a dispensing valve 116 for controlling the flow of sealant 102 into the concentrator 108 is fluidly connected between the pressure regulator 112 and the concentrator 108. A switch 118 is operably connected to the dispensing valve 116, and actuation of the dispensing valve via the switch 118 delivers a metered supply of the sealant 102 to the concentrator 108. According to one aspect, the switch 118 is in the form of a foot pedal 120 operably coupled to the dispensing valve 116; although, alternative arrangements are contemplated. By way of example, FIG. 2 schematically illustrates the sealant application system 100 according to another aspect, wherein the switch 118 is mounted directly to the concentrator 108. An applicator tool 124 separate and removable from the concentrator 108 is adapted to receive the sealant 102 from within the concentrator 108. Further depicted in FIGS. 1 and 2 are a work station table 126 and a concentrator mount 128 secured to the table.

Figure 3:
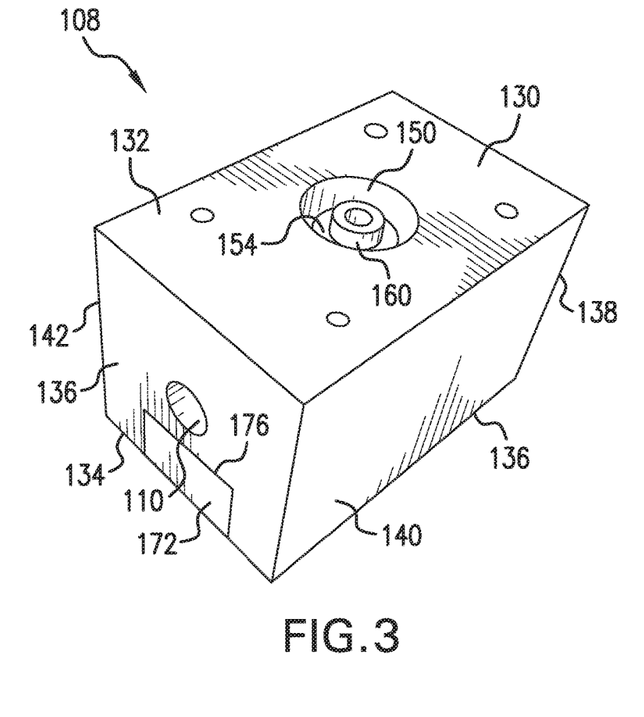
FIG. 3 is a perspective view of a sealant concentrator of the exemplary sealant application system.
Figure 6:
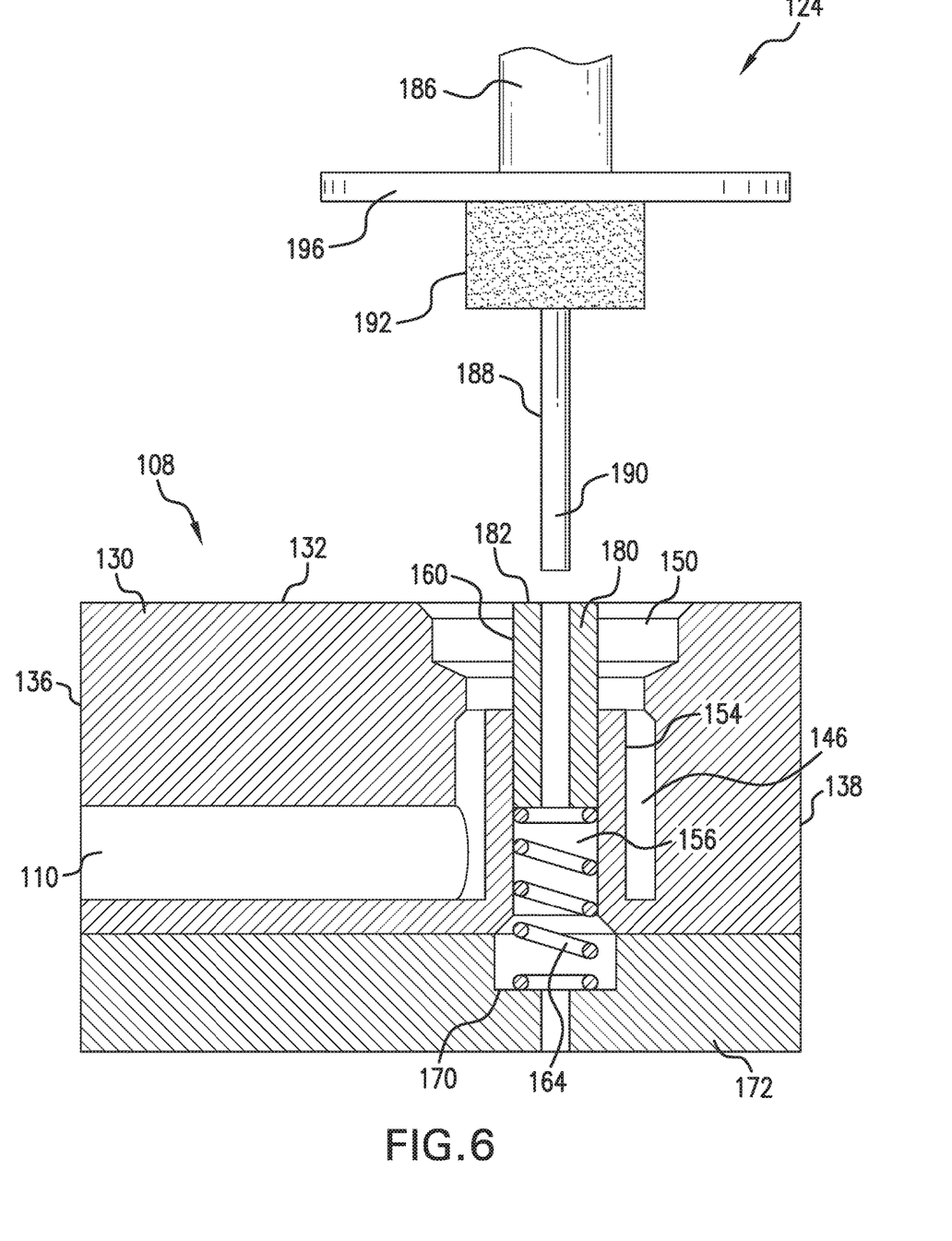
FIGS. 6 and 7 depict the application of sealant stored in the sealant concentrator to the sealant applicator tool.
Figure 7:
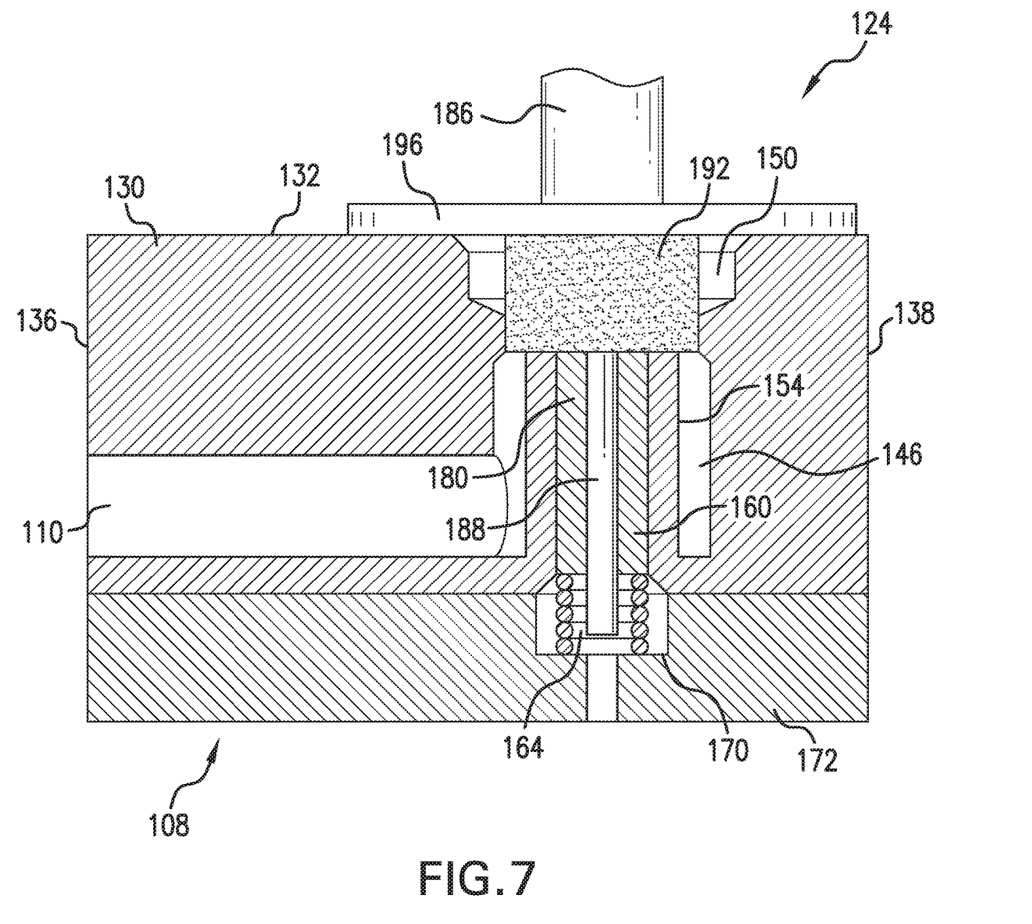

With reference to FIGS. 3, 6 and 7, the concentrator includes a housing 130 with a top wall 132, a bottom wall 134, and a side wall 136 extending between the top and bottom walls. In the depicted aspect, the housing 130 is rectangular shaped and includes side walls 136, 138, 140, 142; although, alternative configurations for the housing 130 are contemplated. By way of example, the housing 130 can be square or cylindrical shaped. The housing 130 has formed therein an inner chamber 146 for receiving the sealant 102, and one of the housing walls has the inlet port 110 in communication with both the source of sealant 104 and the inner chamber 146 for delivery of the sealant into the inner chamber 146. It should be appreciated that the metered supply of the sealant delivered to the concentrator 108 via the dispensing valve 116 is at least partially dependent on the volume of the inner chamber 146 and whether sealant is already within the inner chamber 146. As shown, the side wall 136 can include the inlet port 110. The top wall 132 of the housing 130 has formed therein an open basin 150 in communication with the inner chamber 146. The housing 130 further includes a chimney 154 located within the inner chamber and extending vertically between the top and bottom walls 132, 134. According to one aspect, the chimney 154 is centrally located in the inner chamber 146 such that the sealant 102 within the inner chamber 146 surrounds the chimney 154. The chimney 154 defines a bore 156 for slidingly receiving a guide tube 160. The guide tube 160 is adapted to receive a part of the applicator tool 124 as the applicator tool 124 receives the sealant 102 from within the basin 150. With the guide tube 160 the sealant 102 can be prevented from being applied to that part of the applicator tool 124.

In the depicted embodiment, the housing 130 is adapted to house a spring member 164. The spring member 164 is engaged to the guide tube 160 and is adapted to bias the guide tube 160 upwardly within the chimney 154 through the basin 150 (see FIG. 6). More particularly, one end portion of the spring member 164 is at least partially received in the bore 156, and, according to one aspect, an opposite end portion of the spring member 164 can be seated in a cutout portion 170 provided in an insert member 172. The insert member 172 can be positioned in a channel 176 provided in the bottom wall 134 of the housing 130. However, in lieu of the insert member 172, the opposite end portion of the spring member 164 can be seated on the concentrator mount 128. With the spring member 164, the guide tube 160 is adapted to slide within the chimney bore 156 between a first position where an end portion 180 of the guide tube 160 projects outwardly from the chimney 154 and a surface 182 of the guide tube is approximately flush with the top wall 132 of the housing 130 (FIG. 6), and a second position where the end portion 180 of the guide tube 160 is received in the chimney (FIG. 7).

Figure 5:
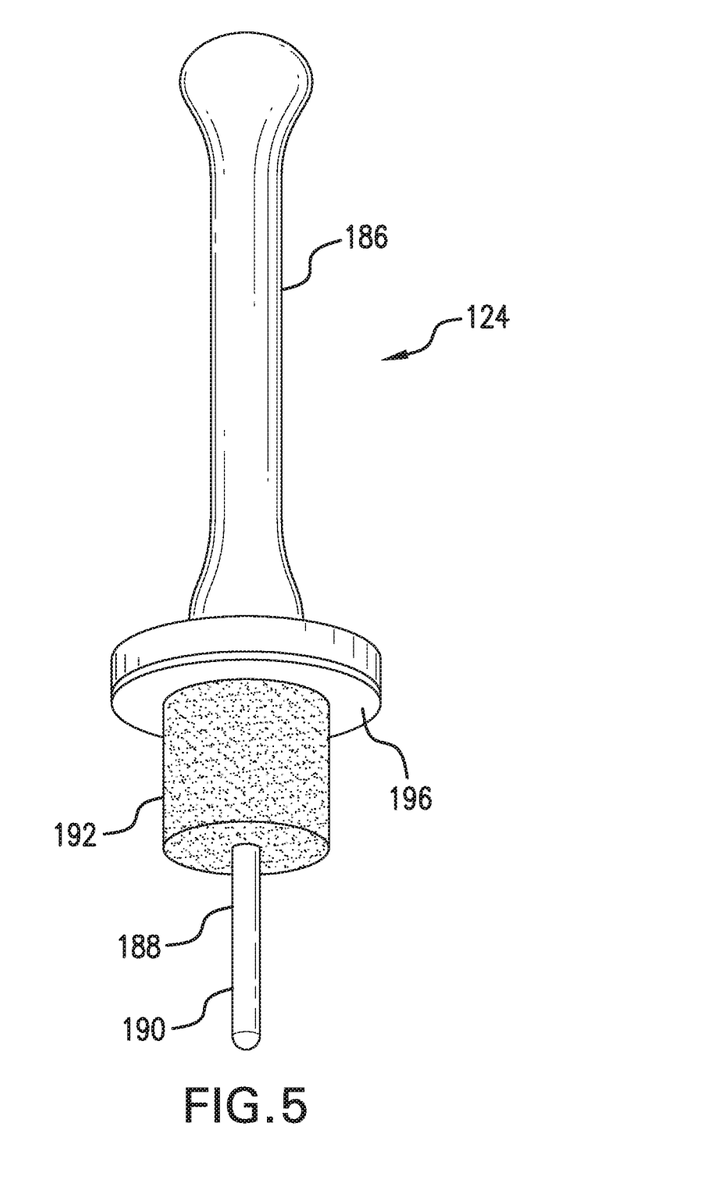
FIG. 5 is a perspective view of a sealant applicator tool of the exemplary sealant application system.

FIG. 5 depicts the exemplary applicator tool 124. The applicator tool 124 includes a handle 186, a stem 188 having a first end portion 194 (FIG. 8) secured to the handle and a free second end portion 190, and a sealant absorbent member 192 secured to the stem 188 and spaced from the second end portion 190. A washer 196 can be interposed between the handle 186 and the absorbent member 192. The washer 196 can be movable on the stem 188 to adjust the axial position of the absorbent member 192. The guide tube 160 is adapted to receive the second end portion 190 of the stem 188, and the basin 150 is adapted to receive the absorbent member 192. Further, in the first position of the guide tube 160, with the second end portion 190 of stem 188 of the applicator tool 124 received in the guide tube, the absorbent member 192 is suspended above the basin 150 (and any sealant contained therein). In the second position of the guide tube 160, the absorbent member 192 is received in the sealant filled basin 150, however, the guide tube 160 substantially prevents application of the sealant on the second end portion 190 of the stem 188.

Figure 4A:
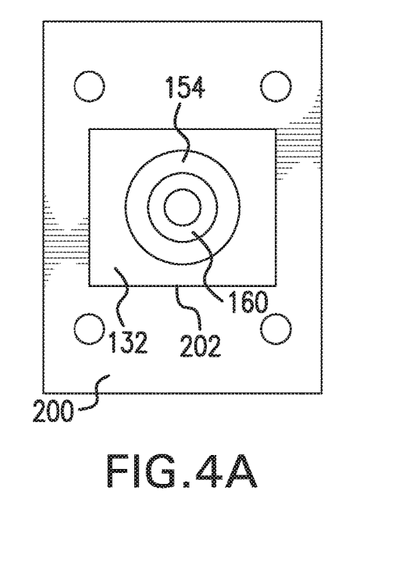
FIGS. 4(a)-4(c) depict alternative designs of plate members which can be secured to the sealant concentrator.
Figure 4B:
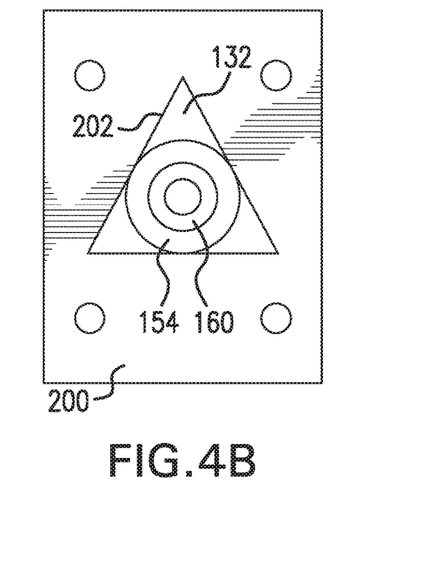
Figure 4C:
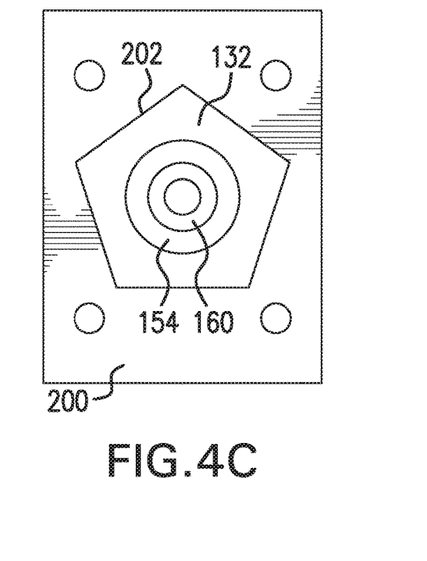

In addition, each of FIGS. 4(a), 4(b) and 4(c) depict a separate plate member 200 that can be removably connected to the top wall 132 of the housing 130. The plate member 200 includes an opening 202 aligned with the basin 150. The openings 202, which can have various shapes, increase a depth and width of the basin 150, and this, in turn, allows for an applicator tool 124 with an enlarged absorbent member 192 having a specified shape.

Figure 11:
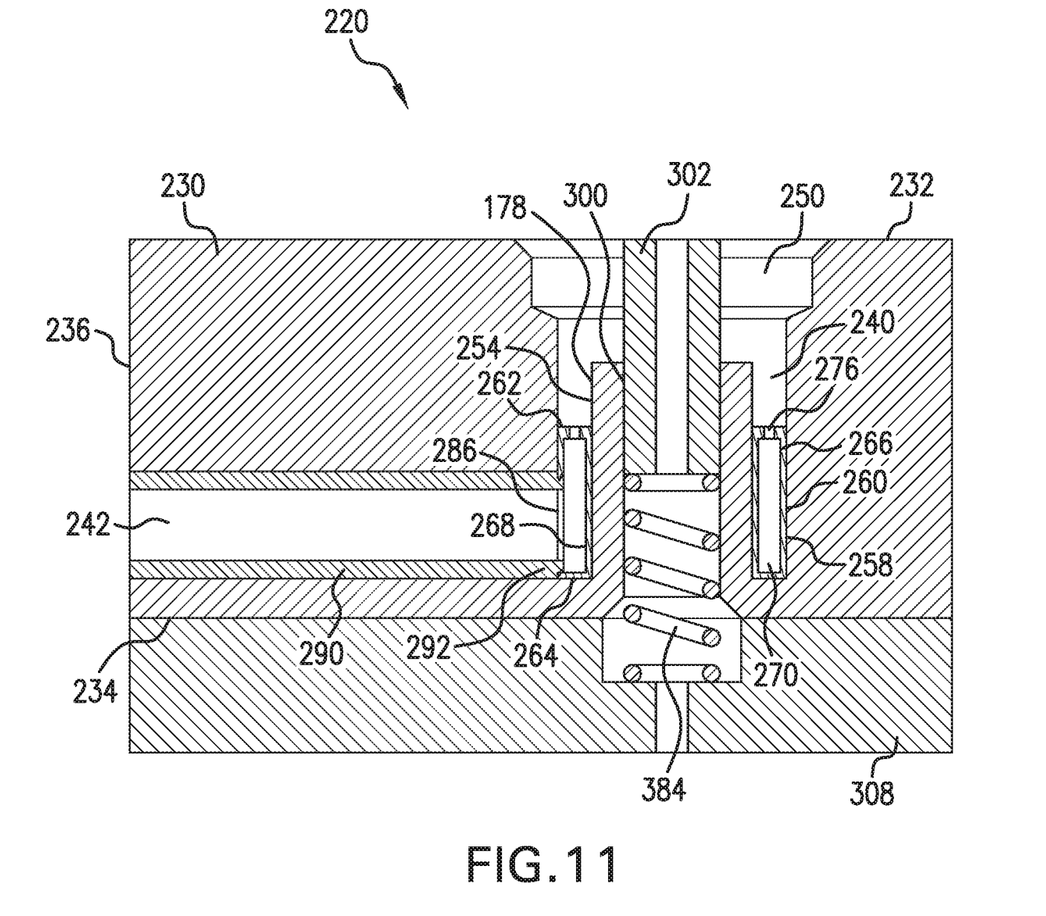
FIG. 11 is a cross-sectional view of a sealant concentrator of the exemplary sealant application system according to another aspect of the present disclosure.
Figure 12:
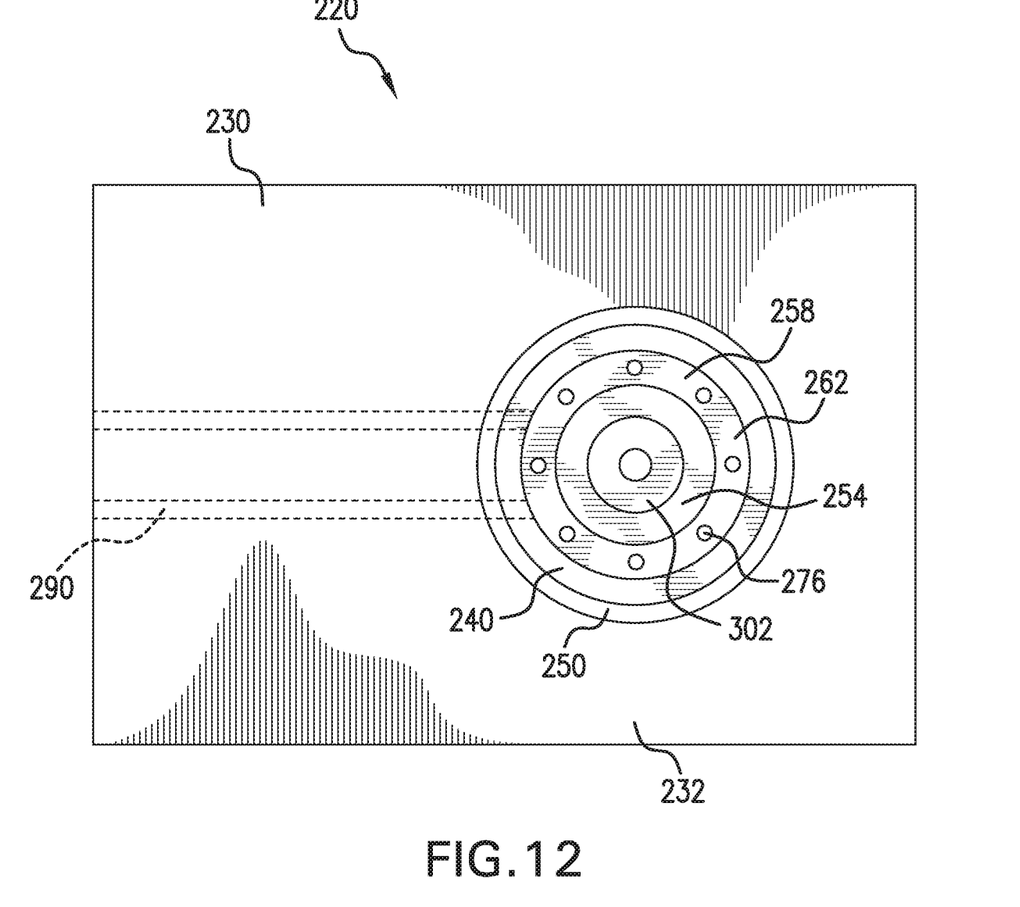
FIG. 12 is a top view of the sealant concentrator of FIG. 11.

FIGS. 11 and 12 depict a sealant concentrator 220 of the exemplary sealant application system 100 according to another aspect of the present disclosure. Similar to the sealant concentrator 108, the sealant concentrator 220 includes a housing 230 with a top wall 232, a bottom wall 234, and a side wall 236. The housing 230 has formed therein an inner chamber 240 for receiving the sealant 102, and one of the housing walls has the inlet port 242 in communication with both the source of sealant 104 and the inner chamber 240 for delivery of the sealant into the inner chamber 240. As shown, the side wall 236 can include the inlet port 242. Again, it should be appreciated that the metered supply of the sealant delivered to the concentrator 220 via the dispensing valve 116 is at least partially dependent on the volume of the inner chamber 240 and whether sealant is already within the inner chamber 240. The top wall 232 of the housing 230 has formed therein an open basin 250 in communication with the inner chamber 240. The housing 230 further includes a chimney 254 located within the inner chamber and extending vertically between the top and bottom walls 232, 234.

According to the depicted aspect, the chimney 254 is centrally located in the inner chamber 240, and a sealant flow guide 258, which can be a part separate from the concentrator 220, is positioned around the chimney 254. The flow guide 258, which is generally doughnut shaped, includes a housing 260 with a top wall 262, a bottom wall 264, and outer and inner side walls 266, 268 extending between the top and bottom walls. The housing 260 has formed therein an inner chamber 270 for receiving the sealant 102, and the top wall 262 includes a plurality of circumferentially spaced apertures 276 for delivery of sealant into the inner chamber 240. As depicted, the top wall 262 is located beneath an upper part 278 of the chimney 254, which allows for even distribution of sealant 102 around the chimney upper part 278 and into the basin 250. Further, the outer side wall 266 includes an inlet port 286 which faces the inlet port 242. And according to one aspect, a separate flow tube 290 for delivery of sealant into the inner chamber 270 can be releasably secured to the outer side wall 266 at the inlet port 286. By way of example, an end portion 292 of the flow tube 290 can include male threads which threadingly engage corresponding female threads provided on the outer side wall 266 surrounding the inlet port 286. The flow tube 290 is sized to be removably received in the inlet port 242 of the concentrator 230.

The chimney 254 defines a bore 300 for slidingly receiving a guide tube 302. Similar to the guide tube 160, the guide tube 302 is adapted to receive a part of the applicator tool 124 as the applicator tool 124 receives the sealant 102 from within the basin 250. The housing 230 is further adapted to house a spring member 304. The spring member 304 is engaged to the guide tube 302 and is adapted to bias the guide tube 302 upwardly within the chimney 254 through the basin 250. An insert member 308 for the spring member 304 can be mounted to the bottom wall 234 of the housing 230.

Figure 13:
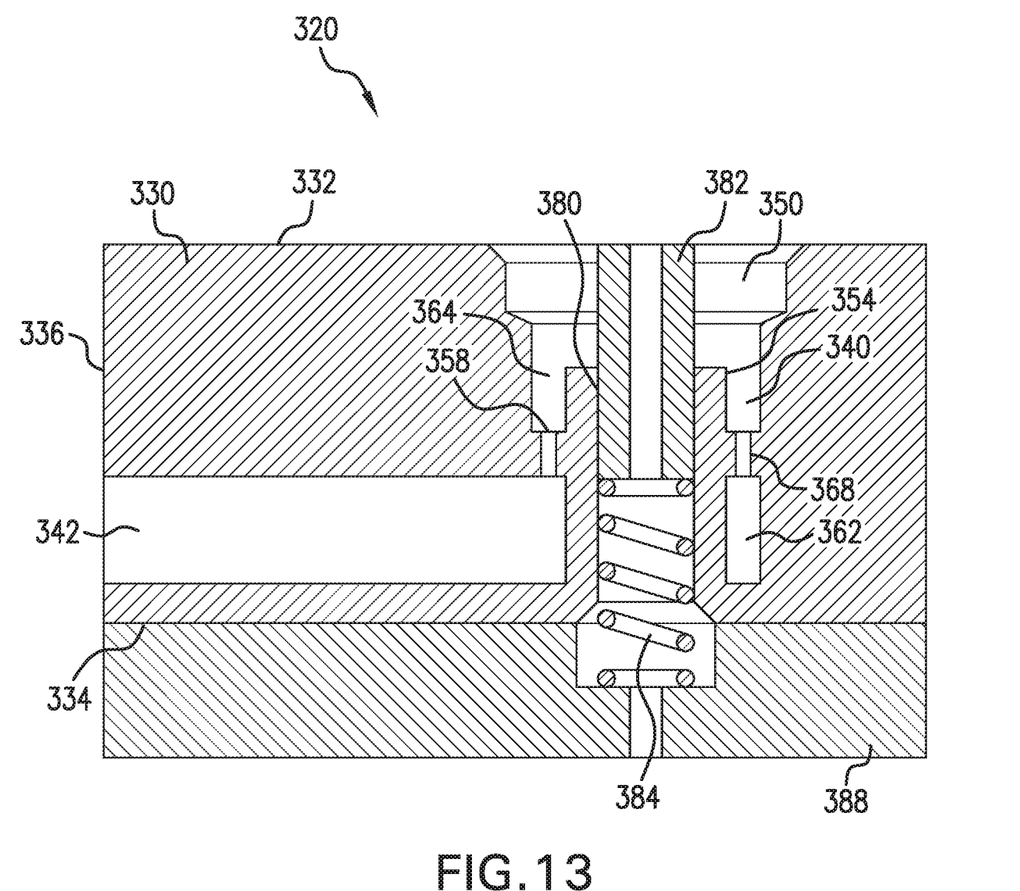
FIG. 13 is a cross-sectional view of a sealant concentrator of the exemplary sealant application system according to another aspect of the present disclosure.

FIG. 13 depicts a sealant concentrator 320 of the exemplary sealant application system 100 according to another aspect of the present disclosure. Similar to the sealant concentrators 108, 220, the sealant concentrator 320 includes a housing 330 with a top wall 332, a bottom wall 334, and a side wall 336. The housing 330 has formed therein an inner chamber 340 for receiving the sealant 102, and one of the housing walls has the inlet port 342 for delivery of the sealant into the inner chamber 340. Again, it should be appreciated that the metered supply of the sealant delivered to the concentrator 320 via the dispensing valve 116 is at least partially dependent on the volume of the inner chamber 340 and whether sealant is already within the inner chamber 340. The top wall 332 of the housing 330 has formed therein an open basin 350 in communication with the inner chamber 340. The housing 330 further includes a chimney 354 located within the inner chamber and extending vertically between the top and bottom walls 332, 334.

According to the depicted aspect, the chimney 354 is centrally located in the inner chamber 340, and a sealant flow guide 358, which is formed integral with the housing 330, is positioned around the chimney 354. The flow guide 358 separates the inner chamber 340 into a lower inner chamber 362 and an upper inner chamber 364. The flow guide 358 includes a plurality of circumferentially spaced apertures 368 surrounding the chimney 354 for delivery of sealant into the inner chamber 340. The apertures 368 are sized to allow for even distribution of sealant 102 from the lower inner chamber 362 to the upper inner chamber 364 and into the basin 350.

Similar to the previous embodiments, the chimney 354 defines a bore 380 for slidingly receiving a guide tube 382. The guide tube 382 is adapted to receive a part of the applicator tool 124 as the applicator tool 124 receives the sealant 102 from within the basin 350. The housing 330 is further adapted to house a spring member 384. The spring member 384 is engaged to the guide tube 382 and is adapted to bias the guide tube 382 upwardly within the chimney 354 through the basin 350. An insert member 388 for the spring member 384 can be mounted to the bottom wall 334 of the housing 330.

Figure 8:
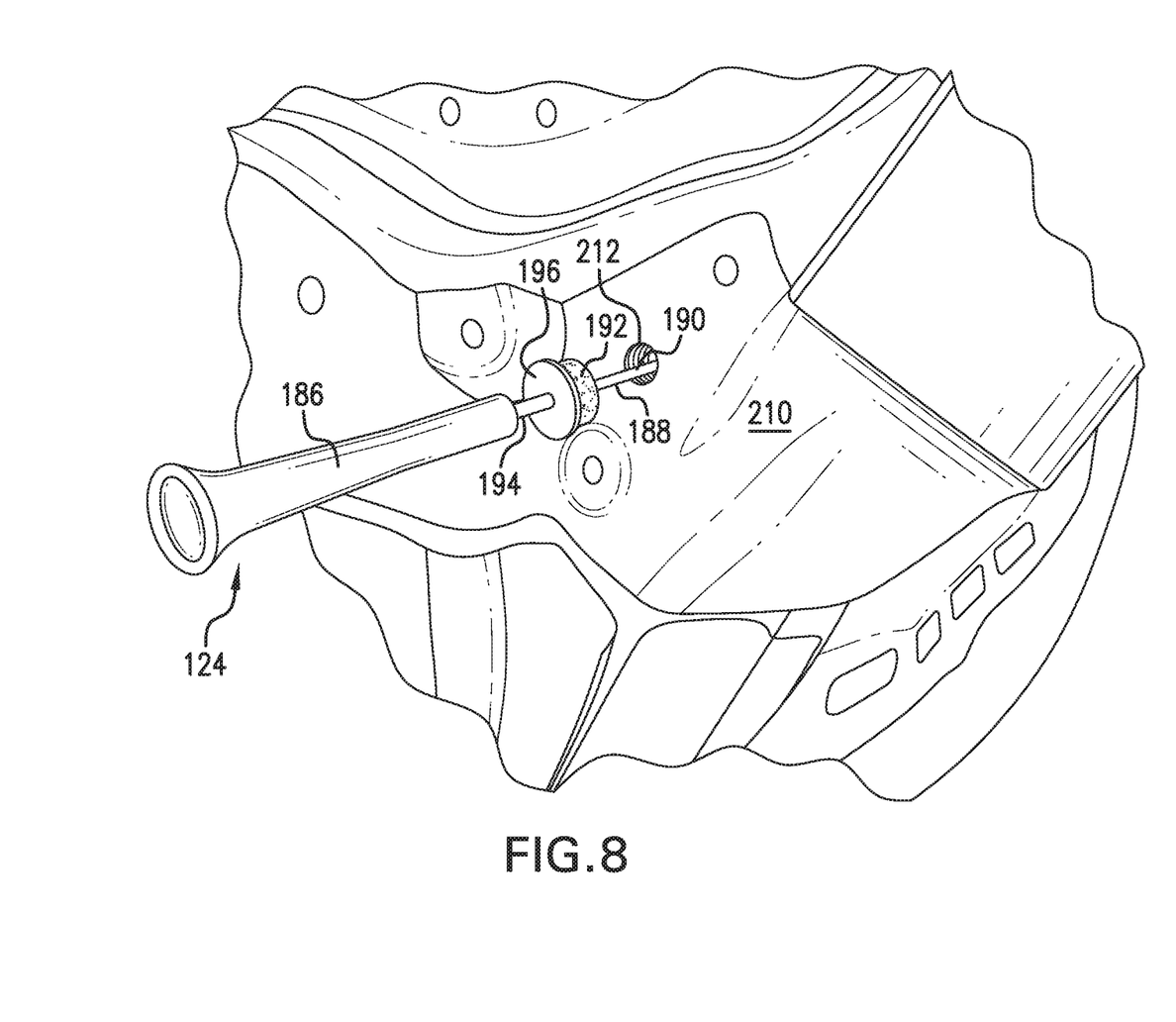
FIGS. 8, 9 and 10 further schematically depict the application of sealant via the sealant applicator tool to a surrounding surface into which an associated fastener extends.
Figure 9:
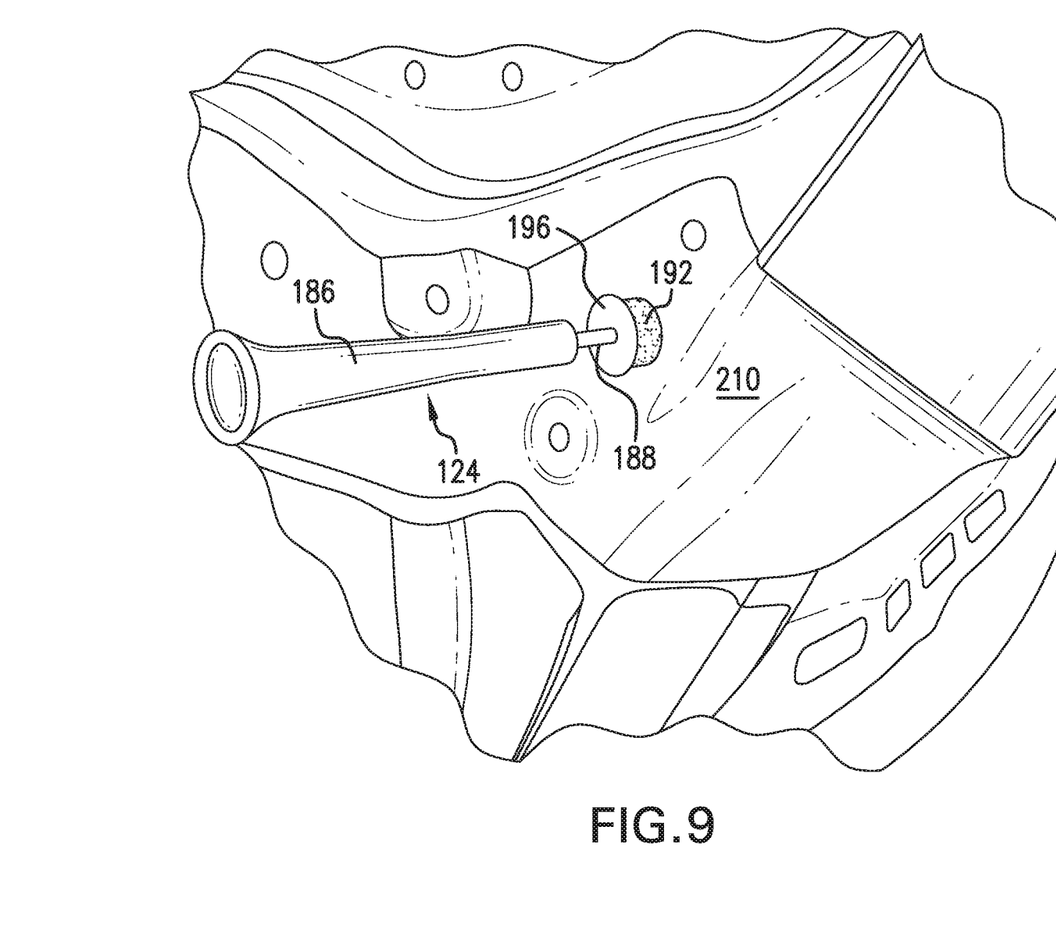
Figure 10:
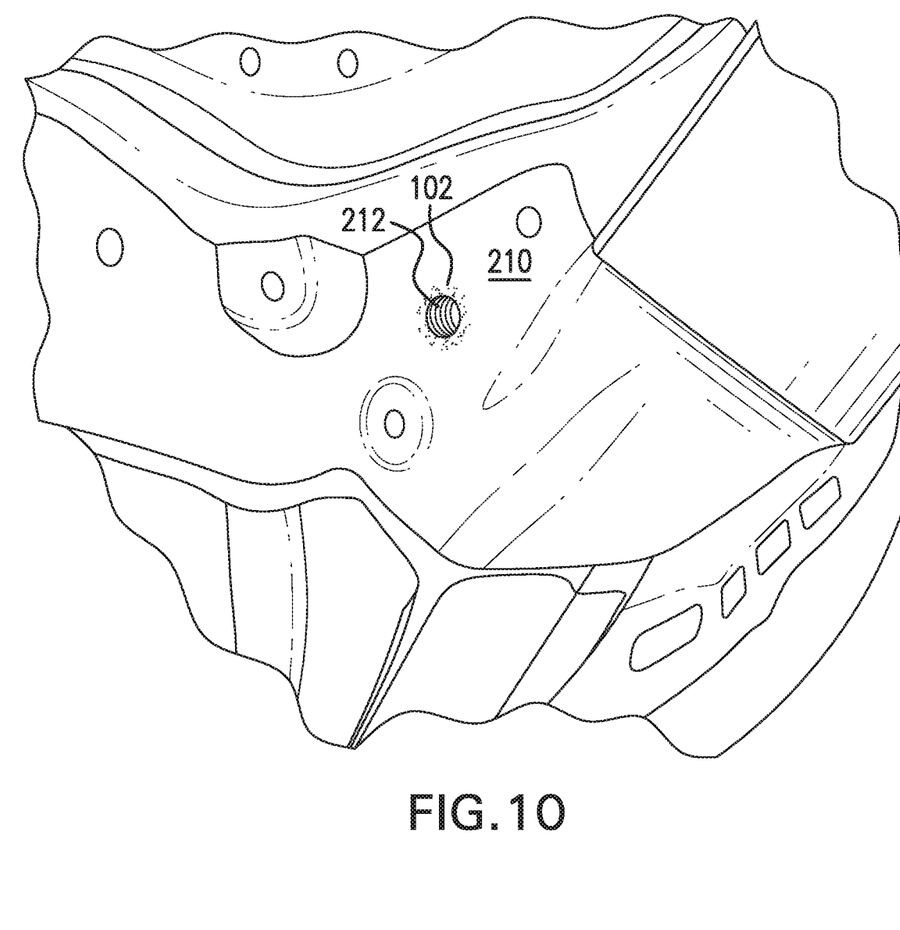

The use of the exemplary sealant application system 100 with, for example, the sealant concentrator 108 will now be described with additional reference to FIGS. 8-10. To fill the inner chamber 146 of the housing 130 with the sealant 102, the switch 118 for the dispensing valve 116 is actuated and a metered supply of the sealant 102 flows into the inlet port 110 and within the inner chamber 146. The stem 188 of the applicator tool 124 is inserted into the guide tube 160 and a downward forced applied to the applicator tool 124 slides the guide tube 160 downwardly against the biasing force of the spring member 164 to its second position allowing the absorbent member 192 to be received in the sealant filled basin 150. With the sealant 102 on the absorbent member 192, the operator can apply the sealant to a surrounding surface 210 of a threaded opening 212, which provides a fluid-tight seal between, for example, a bolt head (not shown) and the surrounding surface 210. As shown, the second end portion 190 of the applicator tool stem 188 is inserted into the threaded opening 212 until the absorbent member 192 directly contacts the surrounding surface 210. The sealant 102 is then applied onto the surrounding surface 210, and the operator can remove the applicator tool 124. As described above, because the guide tube 160 substantially prevents the sealant from being applied to the second end portion 190 of applicator tool stem 188, the threaded opening 212 is not coated with the sealant 102 and the tightening of the fastener is not affected by the application of the sealant. It should be appreciated that the manner of use described above is similar with the sealant concentrators 220, 320.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A sealant application system for applying sealant to a surrounding surface into which an associated fastener extends, the system comprising:
   a source of sealant;
   a concentrator including a housing with a top wall, a bottom wall, and a side wall, the housing including an inner chamber for receiving sealant, one of the housing walls has inlet port in communication with both the source of sealant and the inner chamber for delivery of sealant into the inner chamber, and the top wall has formed therein an open basin in communication with the inner chamber; and
   an applicator tool separate from the concentrator is adapted to receive the sealant from within the basin,
   wherein a dispensing valve is fluidly connected between the source of sealant and the concentrator, a switch is operably connected to the dispensing valve, and actuation of the dispensing valve via the switch delivers a metered supply of the sealant to the concentrator.

2. The system of claim 1, wherein the housing includes a chimney located within the inner chamber and extending between the top and bottom walls.

3. The system of claim 2, wherein the applicator tool includes a handle, a stem having a first end portion secured to the handle and a free second end portion, and a sealant absorbent member secured to the stem and spaced from the second end portion, wherein the chimney is adapted to receive the second end portion of the stem, and the basin is adapted to receive the absorbent member.

4. The system of claim 3, further including a guide tube slidably received within the chimney, the guide tube adapted to receive the second end portion of the stem.

5. The system of claim 4, wherein the guide tube is adapted to slide within the chimney between a first position where an end portion of the guide tube projects outwardly from the chimney allowing the absorbent member to be suspended above the basin, and a second position where the end portion of the guide tube is received in the chimney allowing the absorbent member to be received in the basin.

6. The system of claim 5, wherein the housing is adapted to house a spring member, the spring member engaged to the guide tube and adapted to bias the guide tube upwardly through the basin.

7. The system of claim 4, wherein the sealant within the inner chamber surrounds the chimney, and the guide tube substantially prevents the sealant from being applied to the second end portion of the stem.

8. The system of claim 1, further comprising a pressure regulator fluidly connected between the source of sealant and the concentrator, and the dispensing valve is fluidly connected between the pressure regulator and the concentrator.

9. The system of claim 2, further comprising a flow guide surrounding the chimney, the flow guide includes a plurality of circumferentially spaced apertures for delivery of sealant into the basin.

10. A sealant application system for applying sealant to a surrounding surface into which an associated fastener extends, the system comprising:
 a source of sealant;
 a concentrator including an inlet port in communication with the source of sealant;
 a pressure regulator fluidly connected between the source of sealant and the concentrator, and a dispensing valve fluidly connected between the pressure regulator and the concentrator;
 a switch operably connected to the dispensing valve, wherein actuation of the dispensing valve via the switch delivers a metered supply of the sealant to the concentrator; and
 an applicator tool separate from the concentrator adapted to receive the sealant from within the concentrator.

11. The system of claim 10, wherein the concentrator includes a housing with a top wall, a bottom wall, and a side wall, the housing including an inner chamber for receiving sealant, one of the housing walls has the inlet port in communication with the inner chamber, and the top wall has formed therein an open basin in communication with the inner chamber.

12. The system of claim 11, wherein the housing includes a chimney located within the inner chamber and extending between the top and bottom walls.

13. The system of claim 12, further including a guide tube slidably received within the chimney, the guide tube adapted to receive a part of the applicator tool.

14. The system of claim 13, wherein the housing is adapted to house a spring member, the spring member engaged to the guide tube and adapted to bias the guide tube upwardly through the basin.

15. The system of claim 13, wherein the sealant within the inner chamber surrounds the chimney, and the guide tube substantially prevents the sealant from being applied to the part of the applicator tool.

16. A sealant concentrator for use with a sealant application system for applying sealant to a surrounding surface into which an associated fastener extends, the concentrator comprising:
 a housing with a top wall, a bottom wall, and a side wall, the housing including an inner chamber for receiving sealant, one of the housing walls has inlet port in communication with the inner chamber, the top wall has formed therein an open basin in communication with the inner chamber, and a chimney located within the inner chamber extends between the top and bottom walls, wherein a guide tube is slidably received within the chimney, and the housing is adapted to house a spring member, the spring member engaged to the guide tube and adapted to bias the guide tube upwardly through the basin.

17. The concentrator of claim 16, wherein the guide tube is adapted to slide within the chimney between a first position where an end portion of the guide tube projects outwardly from the chimney and is approximately flush with the top wall, and a second position where the end portion of the guide tube is received in the chimney.

18. The concentrator of claim 16, wherein the inner chamber surrounds the chimney, and further comprising a flow guide surrounding the chimney, the flow guide includes a plurality of circumferentially spaced apertures for delivery of sealant into the basin.

19. The concentrator of claim 16, further including a separate plate member removably connected to the top wall of the housing, the plate member includes an opening aligned with the basin for increasing a depth of the basin.

* * * * *